United States Patent

Fishback et al.

[11] Patent Number: 5,470,501
[45] Date of Patent: Nov. 28, 1995

[54] PROCESSABILITY OF HYDROCARBON BLOWN, POLYISOCYANATE BASED FOAMS THROUGH USE OF A COMPATIBILIZING AGENT

[75] Inventors: Thomas L. Fishback, Gibraltar; Thomas B. Lee, Southgate, both of Mich.

[73] Assignee: BASF Corporation, Mt. Olive, N.J.

[21] Appl. No.: 436,691

[22] Filed: May 8, 1995

[51] Int. Cl.⁶ .............................. C08K 3/00; C08K 18/06
[52] U.S. Cl. .............................. 252/182.28; 252/182.23; 521/115; 521/116; 521/117; 521/128; 521/130; 521/157; 521/163; 521/167; 521/170; 521/172; 521/173
[58] Field of Search .................. 252/182.23, 182.28; 521/115, 116, 117, 128, 130, 157, 163, 167, 170, 172, 173

[56] References Cited

U.S. PATENT DOCUMENTS

| | | |
|---|---|---|
| 4,608,432 | 8/1986 | Magnus et al. |
| 4,644,047 | 2/1987 | Wood |
| 4,644,048 | 2/1987 | Magnus et al. |
| 4,687,594 | 8/1987 | Lietz et al. |
| 4,722,803 | 2/1988 | Magnus et al. |

OTHER PUBLICATIONS

Polyurethanes World Congress, Oct. 10–13, 1993, pp. 33–39.

*Primary Examiner*—Morton Foelak
*Attorney, Agent, or Firm*—Dennis V. Carmen

[57] ABSTRACT

There is now provided a polyisocyanate-based foam made by an organic polyisocyanate with a polyol solution containing a $C_4$–$C_7$ aliphatic and/or cycloaliphatic hydrocarbon as a blowing agent. The hydrocarbon blowing agent is soluble in the polyol solution having polyols with polyester linkages by using a reacted or unreacted compatibilizing agent represented by the formula:

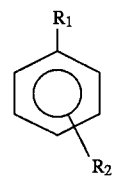

wherein $R^1$ is preferentially OH, and $R^2$ is a $C_6$–$C_{24}$ aliphatic, branched or unbranched, hydrocarbon group.

12 Claims, No Drawings

PROCESSABILITY OF HYDROCARBON BLOWN, POLYISOCYANATE BASED FOAMS THROUGH USE OF A COMPATIBILIZING AGENT

FIELD OF THE INVENTION

The present invention relates to rigid closed cell polyisocyanate based foams, and to the aromatic organic polyisocyanates and polyol solutions used to make such foams. In particular, the invention relates to polyol solutions containing a polyol having polyester linkages, a $C_4$–$C_7$ hydrocarbon blowing agent, and a reacted or unreacted compatibilizing agent.

BACKGROUND OF THE INVENTION

Recently, $C_4$–$C_7$ hydrocarbon blowing agents have gained increasing importance as zero ozone depletion potential alternative blowing agents for polyurethane foams. One problem associated with the use of hydrocarbons is their low solubility in polyols and isocyanates. Blowing agent incompatibility with polyols can lead to processing difficulties on high pressure impingement mixing machines, most noticeably with the calibration of the isocyanates/polyol ratio. The publication in the Oct. 10–13th, 1993 issue of Polyurethanes World Congress entitled "Hydrocarbons Provide Zero ODP and Zero GWP Insulation for Household Refrigeration" describes a foaming apparatus adapted for use with the hydrocarbon blowing agents. As can be seen from FIGS. 2 and 3 in the description of this publication, the hydrocarbon is separately metered into the mix head, or fed into a day tank which is kept under constant agitation. Most of the insulation foams use polyester-based polyols as the base polyol, in which hydrocarbons have only a limited or no solubility. Therefore, to avoid phase separation, the hydrocarbon blowing agent is either metered separately into the high pressure mix head, or kept under constant agitation in a day tank immediately prior to being fed to the mixhead.

It would be desirable to avoid adding the hydrocarbon as a third stream to the mixhead. Since hydrocarbons tend to separate from the polyester based polyols within hours, sometimes minutes, after ceasing vigorous mixing, it would be desirable to formulate a polyol composition in which the hydrocarbon blowing agent is solubilized or held in solution without agitation. A hydrocarbon held as a solution in the polyol would have the advantage of a more uniform distribution throughout the polyol.

SUMMARY OF THE INVENTION

There is now provided a polyol solution containing a polyol having polyester linkages, a blowing agent comprising an aliphatic or cycloaliphatic $C_4$–$C_7$ hydrocarbon, and a reacted or unreacted compatibilizing agent represented by the following formula:

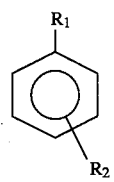

wherein $R^1$ is OH, $NH_2$, COOH, or oxyalkylated addition products thereof; and wherein $R^2$ is a $C_6$–$C_{24}$ aliphatic, branched or unbranched, hydrocarbon group. The reacted or unreacted compatibilizing agent enables the hydrocarbon blowing agent to be solubilized in the polyol having polyester linkages. The resulting polyol solution is stable; and when mixed with an organic aromatic polyisocyanate, there is formed a polyisocyanate-based foam of good quality and a density range of 1.8 to 2.2 pcf.

There is also provided a polyisocyanate-based foamable system of an organic polyisocyanate component having dispersed therein a blowing agent and a polyol solution containing a polyol with polyester linkages, blowing agent, and the reacted or unreacted compatibilizer, where the blowing agent in both the organic polyisocyanate and in the polyol solution is a $C_4$–$C_7$ based aliphatic and/or cycloaliphatic hydrocarbon.

There is also provided a polyisocyanate-based foam and a method of making such foam using a polyisocyanate-based foamable system as described above.

DETAILED DESCRIPTION OF THE INVENTION

The $C_4$–$C_7$ hydrocarbon blowing agents used in the invention, when combined with a reacted or unreacted compatibilizer, form a solution with the polyols having polyester linkages. By a "solution" is meant that the hydrocarbon blowing agent is uniformly dispersed throughout the polyol having the polyester linkages in the absence of agitation and without phase separation for a period of at least 24 hours. The polyol solutions prepared herein remain stable without phase separation for even up to five days.

As the first ingredient in the polyol composition, there is provided an a) polyol having polyester linkages. Preferably, the total amount of polyols in the polyol solution having number average molecular weights of 400 or more have an average functionality of 1.8 to 8, more preferably 3 to 6, and an average hydroxyl number of 150 to 850, more preferably 350 to 800. Polyols having hydroxyl numbers and functionalities outside this range may be used so long as the average hydroxyl number for the total amount of polyols used fall within the aforementioned ranges.

Other types of polyols may be used in combination with the polyol having polyester linkages. Examples of polyols are thioether polyols, polyester amides and polyacetals containing hydroxyl groups, aliphatic polycarbonates containing hydroxyl groups, amine terminated polyoxyalkylene polyethers, polyoxyalkylene polyether polyols, and graft dispersion polyols. Mixtures of at least two of these polyols can be used so long as a polyol having polyester linkages is present in the polyol solution in the aforesaid range.

The terms "polyol having polyester linkages" and "polyester polyol" as used in this specification and claims includes any minor amounts of unreacted polyol remaining after the preparation of the polyester polyol and/or unesterified low molecular weight polyols (e.g., glycol) added after the preparation of the polyester polyol. The polyester polyol can include up to about 40 weight percent free glycol.

Polyols having polyester linkages broadly include any polyol having two or more ester linkages in the compound, such as the conventional polyester polyols and the polyester-polyether polyols.

The polyester polyols advantageously have an average functionality of about 1.8 to 8, preferably about 1.8 to 5, and more preferably about 2 to 3. The commercial polyester polyols used generally have average hydroxyl numbers within a range of about 15 to 750, preferably about 30 to 550, and more preferably about 150 to 500 (taking into account the free glycols that may be present), and their free glycol content generally is from about 0 to 40 weight percent, and usually from 2 to 15 weight percent, of the total polyester polyol component. In calculating the average functionality and hydroxyl number of the total amount of polyols used in the polyol solution, the presence of the free glycols is not taken into account because the glycols have number average molecular weights of less than 400.

Suitable polyester polyols can be produced, for example, from organic dicarboxylic acids with 2 to 12 carbons, preferably aliphatic dicarboxylic acids with 4 to 6 carbons and aromatic bound dicarboxylic acids, and multivalent alcohols, preferably diols, with 2 to 12 carbons, preferably 2 to 6 carbons. Examples of dicarboxylic acids include succinic acid, glutaric acid, adipic acid, suberic acid, azelaic acid, sebacic acid, decanedicarboxylic acid, maleic acid, fumaric acid, phthalic acid, isophthalic acid, and terephthalic acid. The dicarboxylic acids can be used individually or in mixtures. Instead of the free dicarboxylic acids, the corresponding dicarboxylic acid derivatives may also be used such as dicarboxylic acid mono- or di- esters of alcohols with 1 to 4 carbons, or dicarboxylic acid anhydrides. Dicarboxylic acid mixtures of succinic acid, glutaric acid and adipic acid in quantity ratios of 20–35:35–50:20–32 parts by weight are preferred, as well as terephthalic acid and isophthalic acid and their 1–4 carbon ester derivatives. Examples of divalent and multivalent alcohols, especially diols, include ethanediol, diethylene glycol, 1,2- and 1,3-propanediol, dipropylene glycol, 1,4-butanediol, 1,5-pentanediol, 1,6-hexanediol, 1,10-decanediol, glycerine and trimethylolpropanes, tripropylene glycol, tetraethylene glycol, tetrapropylene glycol, tetramethylene glycol, 1,4-cyclohexane-dimethanol, ethanediol, diethylene glycol, 1,4-butanediol, 1,5-pentanediol, 1,6-hexanediol, or mixtures of at least two of these diols are preferred, especially mixtures of 1,4-butanediol, 1,5-pentanediol, and 1,6-hexanediol. Furthermore, polyester polyols of lactones, e.g., ε-caprolactone or hydroxycarboxylic acids, e.g., ω-hydroxycaproic acid, may also be used.

The polyester polyols can be produced by polycondensation of organic polycarboxylic acids, e.g., aromatic or aliphatic polycarboxylic acids and/or derivatives thereof and multivalent alcohols in the absence of catalysts or preferably in the presence of esterification catalysts, generally in an atmosphere of inert gases, e.g., nitrogen, carbon dioxide, helium, argon, etc., in the melt at temperatures of 150° to 250° C., preferably 180° to 220° C., optionally under reduced pressure, up to the desired acid value which is preferably less than 10, especially less than 2. In a preferred embodiment, the esterification mixture is subjected to polycondensation at the temperatures mentioned above up to an acid value of 80 to 30, preferably 40 to 30, under normal pressure, and then under a pressure of less than 500 mbar, preferably 50 to 150 mbar. The reaction can be carried out as a batch process or continuously. When present, excess glycol can be distilled from the reaction mixture during and/or after the reaction, such as in the preparation of low free glycol-containing polyester polyols usable in the present invention. Examples of suitable esterification catalysts include iron, cadmium, cobalt, lead, zinc, antimony, magnesium, titanium and tin catalysts in the form of metals, metal oxides or metal salts. However, the polycondensation may also be preformed in liquid phase in the presence of diluents and/or chlorobenzene for aziotropic distillation of the water of condensation.

To produce the polyester polyols, the organic polycarboxylic acids and/or derivatives thereof and multivalent alcohols are preferably polycondensed in a mole ratio of 1:1–1.8, more preferably 1:1.05–1.2.

After transesterification or esterification, the reaction product can be reacted with an alkylene oxide to form a polyester-polyether polyol mixture. This reaction desirably is catalyzed. The temperature of this process should be from about 80° to 170° C., and the pressure should generally range from about 1 to 40 atmospheres. While the aromatic polyester polyols can be prepared from substantially pure reactant materials, more complex ingredients are advantageously used, such as the side stream, waste or scrap residues from the manufacture of phthalic acid, terephthalic acid, dimethyl terephthalate, polyethylene terephthalate, and the like. Particularly suitable compositions containing phthalic acid residues for use in the invention are (a) ester-containing byproducts from the manufacture of dimethyl terephthalate, (b) scrap polyalkylene terephthalates, (c) phthalic anhydride, (d) residues from the manufacture of phthalic acid or phthalic anhydride, (e) terephthalic acid, (f) residues from the manufacture of terephthalic acid, (g) isophthalic acid, (h) trimellitic anhydride, and (i) combinations thereof. These compositions may be converted by reaction with the polyols of the invention to polyester polyols through conventional transesterification or esterification procedures.

Polyester polyols whose acid component advantageously comprises at least about 30 percent by weight of phthalic acid residues are useful. By phthalic acid residue is meant the group:

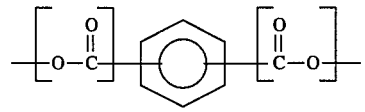

A preferred polycarboxylic acid component for use in the preparation of the aromatic polyester polyols is phthalic anhydride. This component can be replaced by phthalic acid or a phthalic anhydride bottoms composition, a phthalic anhydride crude composition, or a phthalic anhydride light ends composition, as such compositions are defined in U.S. Pat. No. 4,529,744.

Other preferred materials containing phthalic acid residues are polyalkylene terephthalates, especially polyethylene terephthalate (PET), residues or scraps.

Still other preferred residues are DMT process residues, which are waste or scrap residues from the manufacture of dimethyl terephthalate (DMT). The term "DMT process residue" refers to the purged residue which is obtained during the manufacture of DMT in which p-xylene is converted through oxidation and esterification with methanol to the desired product in a reaction mixture along with a complex mixture of byproducts. The desired DMT and the volatile methyl p-toluate byproduct are removed from the reaction mixture by distillation leaving a residue. The DMT and methyl p-toluate are separated, the DMT is recovered and methyl p-toluate is recycled for oxidation. The residue which remains can be directly purged from the process or a portion of the residue can be recycled for oxidation and the remainder diverted from the process or, if desired, the residue can be processed further as, for example, by distillation, heat treatment and/or methanolysis to recover useful constituents which might otherwise be lost, prior to purging the residue from the system. The residue which is finally purged from the process, either with or without additional processing, is herein called DMT process residue.

These DMT process residues may contain DMT, substituted benzenes, polycarbomethoxy diphenyls, benzyl esters of the toluate family, dicarbomethoxy fluorenone, carbomethoxy benzocoumarins and carbomethoxy polyphenols. Cape Industries, Inc. sells DMT process residues under the trademark Terate® 101. DMT process residues having a different composition but still containing the aromatic esters and acids are also sold by DuPont and others. The DMT process residues to be transesterified in accordance with the present invention preferably have a functionality at least slightly greater than 2. Such suitable residues include those disclosed in U.S. Pat. Nos. 3,647,759; 4,411,949; 4,714,717; and 4,897,429; the disclosures of which with respect to the residues are hereby incorporated by reference.

Examples of suitable polyester polyols are those derived from PET scrap and available under the designation Chardol 170, 336A, 560, 570, 571 and 572 from Chardonol and Freol 30-2150 from Freeman Chemical. Examples of suitable DMT derived polyester polyols are Terate® 202, 203, 204, 254, 2541, and 254A polyols, which are available from Cape Industries. Phthalic anhydride derived polyester polyols are commercially available under the designation Pluracol® polyol 9118 from BASF Corporation, and Stepanol PS-2002, PS-2402, PS-2502A, PS-2502, PS-2522, PS-2852, PS-2852E, PS-2552, and PS-3152 from Stepan Company.

Polyoxyalkylene polyether polyols, which can be obtained by known methods, can be mixed with the polyol having polyester linkages. For example, polyether polyols can be produced by anionic polymerization with alkali hydroxides such as sodium hydroxide or potassium hydroxide or alkali alcoholates, such as sodium methylate, sodium ethylate, or potassium ethylate or potassium isopropylate as catalysts and with the addition of at least one initiator molecule containing 2 to 8, preferably 3 to 8, reactive hydrogens or by cationic polymerization with Lewis acids such as antimony pentachloride, boron trifluoride etherate, etc., or bleaching earth as catalysts from one or more alkylene oxides with 2 to 4 carbons in the alkylene radical. Any suitable alkylene oxide may be used such as 1,3-propylene oxide, 1,2- and 2,3-butylene oxide, amylene oxides, styrene oxide, and preferably ethylene oxide and 1,2-propylene oxide and mixtures of these oxides. The polyalkylene polyether polyols may be prepared from other starting materials such as tetrahydrofuran and alkylene oxide-tetrahydrofuran mixtures; epihalohydrins such as epichlorohydrin; as well as aralkylene oxides such as styrene oxide. The polyalkylene polyether polyols may have either primary or secondary hydroxyl groups.

Included among the polyether polyols are polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, poly-1,4-tetramethylene and polyoxyethylene glycols, and copolymer glycols prepared from blends or sequential addition of two or more alkylene oxides. The polyalkylene polyether polyols may be prepared by any known process such as, for example, the process disclosed by Wurtz in 1859 and *Encyclopedia of Chemical Technology*, Vol. 7, pp. 257–262, published by Interscience Publishers, Inc. (1951) or in U.S. Pat. No. 1,922,459.

Polyethers which are preferred include the alkylene oxide addition products of polyhydric alcohols such as ethylene glycol, propylene glycol, dipropylene glycol, trimethylene glycol, 1,2-butanediol, 1,5-pentanediol, 1,6-hexanediol, 1,7-heptanediol, hydroquinone, resorcinol glycerol, glycerine, 1,1,1-trimethylol-propane, 1,1,1-trimethylolethane, pentaerythritol, 1,2,6-hexanetriol, α-methyl glucoside, sucrose, and sorbitol. Also included within the term "polyhydric alcohol" are compounds derived from phenol such as 2,2-bis(4-hydroxyphenyl)-propane, commonly known as Bisphenol A.

Suitable organic amine starting materials include aliphatic and cycloaliphatic amines and mixtures thereof, having at least one primary amino group, preferably two or more primary amino groups, and most preferable are the diamines. Specific non-limiting examples of aliphatic amines include monoamines having 1 to 12, preferably 1 to 6 carbon atoms, such as methylamine, ethylamine, butylamine, hexylamine, octylamine, decylamine and dodecylamine; aliphatic diamines such as 1,2-diaminoethane, propylene diamine, 1,4-diaminobutane, 1,6-diaminohexane, 2,2-dimethyl-,3-propanediamine, 2-methyl-1,5-pentadiamine, 2,5-dimethyl-2,5-hexanediamine, and 4-aminomethyloctane-1,8-diamine, and amino acid-based polyamines such as lysine methyl ester, lysine aminoethyl ester and cystine dimethyl ester; cycloaliphatic monoamines of 5 to 12, preferably of 5 to 8, carbon-atoms in the cycloalkyl radical, such as cyclohexylamine and cyclo-octylamine and preferably cycloaliphatic diamines of 6 to 13 carbon atoms, such as cyclohexylenediamine, 4,4'-, 4,2'-, and 2,2'-diaminocyclohexylmethane and mixtures thereof; aromatic monoamines of 6 to 18 carbon atoms, such as aniline, benzylamine, toluidine and naphthylamine and preferably aromatic diamines of 6 to 15 carbon atoms, such as phenylenediamine, naphthylenediamine, fluorenediamine, diphenyldiamine, anthracenediamine, and preferably 2,4- and 2,6-toluenediamine and 4,4'-, 2,4'-, and 2,2'-diaminodiphenylmethane, and aromatic polyamines such as 2,4,6-triaminotoluene, mixtures of polyphenyl-polymethylene-polyamines, and mixtures of diaminidiphenylmethanes and polyphenyl-polymethylene-polyamines. Preferred are ethylenediamine, propylenediamine, decanediamine, 4,4'-diaminophenylmethane, 4,4'-diaminocyclohexylmethane, and toluenediamine.

Suitable initiator molecules also include alkanolamines such as ethanolamine, diethanolamine, N-methyl- and N-ethylethanolamine, N-methyl- and N-ethyldiethanolamine and triethanolamine plus ammonia.

Suitable polyhydric polythioethers which may be condensed with alkylene oxides include the condensation product of thiodiglycol or the reaction product of a dicarboxylic acid such as is disclosed above for the preparation of the polyester polyols with any other suitable thioether glycol.

The polyester polyol may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the polyester polyol with only a portion of the components being a diamine such as ethylene diamine.

Polyhydroxyl-containing phosphorus compounds which may be used include those compounds disclosed in U.S. Pat. No. 3,639,542. Preferred polyhydroxyl-containing phosphorus compounds are prepared from alkylene oxides and acids of phosphorus having a $P_2O_5$ equivalency of from about 72 percent to about 95 percent.

Suitable polyacetals which may be condensed with alkylene oxides include the reaction product of formaldehyde or other suitable aldehyde with a dihydric alcohol or an alkylene oxide such as those disclosed above.

Suitable aliphatic thiols which may be condensed with alkylene oxides include alkanethiols containing at least two -SH groups such as 1,2-ethanedithiol, 1,2-propanedithiol, 1,2-propanedithiol, and 1,6-hexanedithiol; alkene thiols such as 2-butene-1,4-dithiol; and alkyne thiols such as 3-hexyne-1,6-dithiol.

Also suitable for mixture with the compound having polyester linkages are polymer modified polyols, in particular, the so-called graft polyols. Graft polyols are well known to the art and are prepared by the in situ polymerization of one or more vinyl monomers, preferably acrylonitrile and styrene, in the presence of a polyether or polyester polyol, particularly polyols containing a minor amount of natural or induced unsaturation. Methods of preparing such graft polyols may be found in columns 1–5 and in the Examples of U.S. Pat. No. 3,652,639; in columns 1–6 and the Examples of U.S. Pat. No. 3,823,201; particularly in columns 2–8 and the Examples of U.S. Pat. No. 4,690,956; and in U.S. Pat. No. 4,524,157; all of which patents are herein incorporated by reference.

Non-graft polymer modified polyols can also be mixed, for example, those prepared by the reaction of a polyisocyanate with an alkanolamine in the presence of a polyol as taught by U.S. Pat. Nos. 4,293,470; 4,296,213; and 4,374,209; dispersions of polyisocyanurates containing pendant urea groups as taught by U.S. Pat. No. 4,386,167; and polyisocyanurate dispersions also containing biuret linkages as taught by U.S. Pat. No. 4,359,541. Other polymer modified polyols may be prepared by the in situ size reduction of polymers until the particle size is less than 20 μm, preferably less than 10 μm.

As a second ingredient in the polyol solution, there is provided a b) aliphatic or cycloaliphatic $C_4$–$C_7$ hydrocarbon blowing agent. The blowing agent should have a boiling point of 50° C. or less at one atmosphere, preferably 38° C. or less.

The hydrocarbon is physically active and has a sufficiently low boiling point to be gaseous at the exothermic temperatures caused by the reaction between the isocyanate and polyols, so as to foam the resulting polyurethane matrix. The hydrocarbon blowing agents consist exclusively of carbon and oxygen, therefore, they are non-halogenated by definition. Examples of the $C_4$–$C_7$ hydrocarbon blowing agents include linear or branched alkanes, e.g. butane, isobutane, 2,3 dimethylbutane, n- and isopentane and technical-grade pentane mixtures, n- and isohexanes, and n- and isoheptanes. Specific examples of alkenes are 1-pentene, 2-methylbutene, 3-methylbutene, and 1-hexene, and of cycloalkanes are cyclobutane, preferably cyclopentane, cyclohexane or mixtures thereof. Preferentially, cyclopentane, n- and isopentane, (including their technical grades) and mixtures thereof are employed.

Other blowing agents which can be used in combination with the one or more $C_4$–$C_7$ hydrocarbon blowing agents may be divided into the chemically active blowing agents which chemically react with the isocyanate or with other formulation ingredients to release a gas for foaming, and the physically active blowing agents which are gaseous at the exotherm foaming temperatures or less without the necessity for chemically reacting with the foam ingredients to provide a blowing gas. Included with the meaning of physically active blowing agents are those gases which are thermally unstable and decompose at elevated temperatures.

Examples of chemically active blowing agents are preferentially those which react with the isocyanate to liberate gas, such as $CO_2$. Suitable chemically active blowing agents include, but are not limited to, water, mono- and polycarboxylic acids having a molecular weight of from 46 to 300, salts of these acids, and tertiary alcohols.

Water is preferentially used as a co-blowing agent with the hydrocarbon blowing agent. Water reacts with the organic isocyanate to liberate $CO_2$ gas which is the actual blowing agent. However, since water consumes isocyanate groups, an equivalent molar excess of isocyanate must be used to make up for the consumed isocyanates.

The organic carboxylic acids used are advantageously aliphatic mon- and polycarboxylic acids, e.g. dicarboxylic acids. However, other organic mono- and polycarboxylic acids are also suitable. The organic carboxylic acids may, if desired, also contain substituents which are inert under the reaction conditions of the polyisocyanate polyaddition or are reactive with isocyanate, and/or may contain olefinically unsaturated groups. Specific examples of chemically inert substituents are halogen atoms, such as fluorine and/or chlorine, and alkyl, e.g. methyl or ethyl. The substituted organic carboxylic acids expediently contain at least one further group which is reactive toward isocyanates, e.g. a mercapto group, a primary and/or secondary amino group, or preferably a primary and/or secondary hydroxyl group.

Suitable carboxylic acids are thus substituted or unsubstituted monocarboxylic acids, e.g. formic acid, acetic acid, propionic acid, 2-chloropropionic acid, 3-chloropropionic acid, 2,2-dichlorpropionic acid, hexanoic acid, 2-ethyl-hexanoic acid, cyclohexanecarboxylic acid, dodecanoic acid, palmitic acid, stearic acid, oleic acid, 3-mercapto-propionic acid, glycoli acid, 3-hydroxypropionic acid, lactic acid, ricinoleic acid, 2-aminopropionic acid, benzoic acid, 4-methylbenzoic acid, salicylic acid and anthranilic acid, and unsubstituted or substituted polycarboxylic acids, preferably dicarboxylic acids, e.g. oxalic acid, malonic acid, succinic acid, fumaric acid, maleic acid, glutaric acid, adipic acid, sebacic acid, dodecanedioic acid, tartaric acid, phthalic acid, isophthalic acid and citric acid. Preferable acids are formic acid, propionic acid, acetic acid, and 2-ethylhexanoic acid, particularly formic acid.

The amine salts are usually formed using tertiary amines, e.g. triethylamine, dimethylbenzylamine, diethylbenzylamine, triethylenediamine, or hydrazine. Tertiary amine salts of formic acid may be employed as chemically active blowing agents which will react with the organic isocyanate. The salts may be added as such or formed in situ by reaction between any tertiary amine (catalyst or polyol) and formic acid contained in the polyol composition.

Combinations of any of the aforementioned chemically active blowing agents may be employed, such as formic acid, salts of formic acid, and/or water.

Physically active blowing agents are those which boil at the exotherm foaming temperature or less, preferably at 50° C. or less at 1 atmosphere. The most preferred physically active blowing agents are those which have an ozone depletion potential of 0.05 or less. Examples of other physically active blowing agents are dialkyl ethers, cycloalkylene ethers and ketones; hydrochlorofluorocarbons (HCFCs); hydrofluorocarbons (HFCs); perfluorinated hydrocarbons (HFCs); fluorinated ethers (HFCs); and decomposition products.

Any hydrochlorofluorocarbon blowing agent may be used in the present invention. Preferred hydrochlorofluorocarbon blowing agents include 1-chloro-1,2-difluoroethane; 1-chloro-2,2-difluoroethane (142a); 1-chloro-1,1-difluoroethane (142b); 1,1-dichloro-1-fluoroethane (141b); 1-chloro- 1,1,2-trifluoroethane; 1-chloro-1,2,2-trifluoroethane; 1,1-diochloro-1,2-difluoroethane; 1-chloro-1,1,2,2-tetrafluoroethane (124a); 1-chloro-1,2,2,2-tetrafluoroethane (124); 1,1-dichloro-1,2,2-trifluoroethane; 1,1-dichloro-2,2,2-trifluoroethane (123); and 1,2-dichloro-1,1,2-trifluoroethane (123a); monochlorodifluoromethane (HCFC-22); 1-chloro-2,2,2-trifluoroethane (HCFC-133a); gem-chlorofluoroethylene (R-1131a); chloroheptafluoropropane (HCFC-217); chlorodifluoroethylene (HCFC-1122); and transchlorofluoroethylene (HCFC-1131). The most preferred hydrochlorofluorocarbon blowing agent is 1,1-dichloro-1-fluoroethane (HCFC-141b).

Suitable hydrofluorocarbons, perfluorinated hydrocarbons, and fluorinated ethers include difluoromethane (HFC-32); 1,1,1,2-tetrafluoroethane (HFC-134a); 1,1,2,2-tetrafluoroethane (HFC-134); 1,1-difluoroethane (HFC-152a); 1,2-difluoroethane (HFC-142), trifluoromethane; heptafluoropropane; 1,1,1-trifluoroethane; 1,1,2-trifluoroethane; 1,1,1,2,2-pentafluoropropane; 1,1,1,3-tetrafluoropropane; 1,1,2,3,3-pentafluoropropane; 1,1,1,3,3-pentafluoro-n-butane; hexafluorocyclopropane (C-216); octafluorocyclobutane (C-318); perfluorotetrahydrofuran; perfluoroalkyl tetrahydrofurans; perfluorofuran; perfluoro-propane, -butane, -cyclobutane, -pentane, -cyclopentane, and -hexane, -cyclohexane, -heptane, and -octane; perfluorodiethyl ether; perfluorodipropyl ether; and perfluoroethyl propyl ether.

Decomposition type physically active blowing agents which release a gas through thermal decomposition include pecan flour, amine/carbon dioxide complexes, and alkyl alkanoate compounds, especially methyl and ethyl formates.

The total and relative amounts of blowing agents will depend upon the desired foam density, the type of hydrocarbon, and the amount and type of additional blowing agents employed. Polyurethane foam densities typical for rigid polyurethane insulation applications range from free rise densities of 1.3 to 2.5 pcf, preferably from 1.3 to 2.1 pcf, and overall molded densities of 1.5 to 3.0 pcf. The amount by weight of all blowing agents is generally 10 php to 40 php, preferably 20 php to 35 php (php means parts per hundred parts of all polyols). Based on the weight of all the foaming ingredients, the total amount of blowing agent is generally from 4 wt % to 15 wt %. The amount of hydrocarbon blowing agent, based on the weight of all the foaming ingredients, is also from 4 wt. % to 15 wt %, preferably from 6 wt % to 10 wt %.

Water is typically found in minor quantities in the polyols as a byproduct and may be sufficient to provide the desired blowing from a chemically active substance. Preferably, however, water is additionally introduced into the polyol solution in amounts from 0.05 to 5 pbw, preferably from 0.25 to 1.0 php.

As a third ingredient in the polyol solution, there is provided a c) reacted or unreacted compatibilizer represented by the following formula:

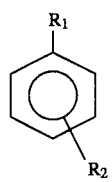

wherein $R^1$ is OH, $NH_2$, COOH, or oxyalkylated addition products thereof; and wherein $R^2$ is a $C_6$–$C_{24}$ aliphatic, branched or unbranched, hydrocarbon group.

In one embodiment of the invention, the $R^1$ group is OH or an oxyalkylated addition product thereof; and $R^2$ is the saturated, unbranched (linear) hydrocarbon group. In another more preferred embodiment, $R^2$ is a $C_8$–$C_{18}$ hydrocarbon group. For example, the reacted or unreacted compatibilizer may be a phenolic compound or oxyalkylated products thereof, having a $C_9$ hydrocarbon radical attached to the aromatic ring, such as nonyl phenol or its oxyalkylated addition product. The hydrocarbon group $R^2$ may be attached to the aromatic ring in the ortho, meta, or para positions, or be a mixture of compounds having $R_2$ groups attached in different positions along the aromatic chain.

In another embodiment, the hydroxyl group of the formula reacted or unreacted compatibilizer may be oxyalkyated with ethylene oxide, propylene oxide, butylene oxide, or mixtures thereof, most preferably with ethylene oxide, propylene oxide, or mixtures thereof. The reacted or unreacted compatibilizer may be oxyalkylated in a block fashion or in a heteric fashion. For example, the reacted or unreacted compatibilizer may contain an internal block of oxypropylene units condensed onto the hydroxyl group, with a terminal block of oxyethylene units. Alternatively, the reacted or unreacted compatibilizer may contain only a block of oxyethylene units, or a mixture of oxyethylene and oxypropylene units, optionally as an internal block and capped with ethylene oxide or propylene oxide. The molar quantities of the oxyalkylene groups can each vary from zero to three hundred (300), with the number average molecular weight of the oxyalkylated compatibilizer ranging from 250 to 12,000. Descriptions of the various types of compatibilizers and their methods of preparation may be found in U.S. Pat. Nos. 4,687,594; 4,644,048; 4,644,047; 4,608,432; and 4,722,803; the disclosures of which each are incorporated herein by reference.

For purposes of this invention, the phrase "reacted or unreacted compatibilizer" is taken to mean that the compatibilizer may be blended with the polyol having polyester linkages (unreacted), or the compatibilizer may be used as a reactant in the manufacture of the polyol having polyester linkages such as to covalently bond to the polyol chain (reacted). For example, a reacted compatibilizer would be one that has been reacted together with a mixture of dicarboxylic acid compound or derivative thereof such as phthalic acid, terephthalic acid, or DMT, and an aliphatic diol compound such as ethylene glycol. The methods of preparation of reacted compatibilizers can also be found in U.S. Pat. Nos. 4,687,594; 4,644,048; 4,644,047; 4,608,432; and 4,722,803; the entire disclosures of which each are incorporated herein by reference.

The $R^1$ group should remain hydrophilic to compatibilize with the polar polyester groups on the polyol, while the $R^2$ group is hydrophobic to compatibilize with the hydrophobic $C_4$–$C_7$ hydrocarbon blowing agent. While the $R^2$ group may be branched, it is preferable that the branching, if present, be located within 1–3 carbon atoms closest to the aromatic ring; and most preferably, the branched groups are $C_1$–$C_3$ alkyl groups. Generally, however, the hydrocarbon group is linear to provide greater hydrophobicity.

The amount of reacted or unreacted compatibilizer is effective to bring the amount of hydrocarbon into solution with the polyol having polyester linkages. This amount will vary depending upon the type of reacted or unreacted compatibilizer used, the type of hydrocarbon used, the amount of hydrocarbon, and the kind of polyol having polyester linkages used. Generally, however, the amount of reacted or unreacted compatibilizer will range from 1 to 30 php.

Additional optional ingredients in the polyol solution may include isocyanate and/or isocyanurate promoting catalysts, surfactants, flame retardants, and fillers.

Catalysts may be employed which greatly accelerate the reaction of the compounds containing hydroxyl groups and with the modified or unmodified polyisocyanates. Examples of suitable compounds are cure catalysts which also function to shorten tack time, promote green strength, and prevent foam shrinkage. Suitable cure catalysts are organometallic catalysts, preferably organotin catalysts, although it is possible to employ metals such as lead, titanium, copper, mercury, cobalt, nickel, iron, vanadium, antimony, and manganese. Suitable organometallic catalysts, exemplified here by tin as the metal, are represented by the formula: $R_nSn[X-R^1-Y]_2$, wherein R is a $C_1-C_8$ alkyl or aryl group, $R^1$ is a $C_0-C_{18}$ methylene group optionally substituted or branched with a $C_1-C_4$ alkyl group, Y is hydrogen or an hydroxyl group, preferably hydrogen, X is methylene, an —S—, an —$SR^2COO$—, —SOOC—, an —$O_3S$—, or an —OOC— group wherein $R^2$ is a $C_1-C_4$ alkyl, n is 0 or 2, provided that $R^1$ is $C_0$ only when X is a methylene group. Specific examples are tin (II) acetate, tin (II) octanoate, tin (II) ethylhexanoate and tin (II) laurate; and dialkyl (1–8C) tin (IV) salts of organic carboxylic acids having 1–32 carbon atoms, preferably 1–20 carbon atoms, e.g., diethyltin diacetate, dibutyltin diacetate, dibutyltin diacetate, dibutyltin dilaurate, dibutyltin maleate, dihexyltin diacetate, and dioctyltin diacetate. Other suitable organotin catalysts are organotin alkoxides and mono or polyalkyl (1–8 C) tin (IV) salts of inorganic compounds such as butyltin trichloride, dimethyl- and diethyl- and dibutyl- and dioctyl- and diphenyl-tin oxide, dibutyltin dibutoxide, di(2-ethylhexyl) tin oxide, dibutyltin dichloride, and dioctyltin dioxide. Preferred, however, are tin catalysts with tin-sulfur bonds which are resistant to hydrolysis, such as dialkyl (1–20 C) tin dimercaptides, including dimethyl-, dibutyl-, and dioctyl- tin dimercaptides.

Tertiary amines also promote urethane linkage formation, and include triethylamine, 3-methoxypropyldimethylamine, triethylenediamine, tributylamine, dimethylbenzylamine, N-methyl-, N-ethyl- and N-cyclohexylmorpholine, N,N,N', N'-tetramethylethylenediamine, N,N,N',N'-tetramethylbutanediamine or -hexanediamine, N,N,N'-trimethyl isopropyl propylenediamine, pentamethyldiethylenetriamine, tetramethyldiaminoethyl ether, bis(dimethylaminopropyl)urea, dimethylpiperazine, 1-methyl-4-dimethylaminoethylpiperazine, 1,2-dimethylimidazole, 1-azabicylo[3.3.0]octane and preferably 1,4-diazabicylo[2.2.2]octane, and alkanolamine compounds, such as triethanolamine, triisopropanolamine, N-methyl- and N-ethyldiethanolamine and dimethylethanolamine.

To prepare the polyisocyanurate (PIR) and the PUR-PIR foams of the invention, a polyisocyanurate catalyst is employed. Suitable polyisocyanurate catalysts are alkali salts, for example, sodium salts, preferably potassium salts and ammonium salts, of organic carboxylic acids, expediently having from 1 to 8 carbon atoms, preferably 1 or 2 carbon atoms, for example, the salts of formic acid, acetic acid, propionic acid, or octanoic acid, and tris(dialkylaminoethyl)-, tris(dimethylaminopropyl)-, tris(dimethylaminobutyl)- and the corresponding tris(diethylaminoalkyl)-s-hexahydrotriazines. However, (trimethyl-2-hydroxypropyl)ammonium formate, (trimethyl-2-hydroxypropyl)ammonium octanoate, potassium acetate, potassium formate and tris(diemthylaminopropyl)-s-hexahydrotriazine are polyisocyanurate catalysts which are generally used. The suitable polyisocyanurate catalyst is usually used in an amount of from 1 to 10 php, preferably from 1.5 to 8 php. In addition to using a polyisocyanurate catalyst, the organic isocyanates are generally reacted with the polyol solution at an isocyanate index of 200 or more, preferably between 250 to 350, in the manufacture of PIR foams.

Examples of suitable flame retardants are tetrakis(2-chloroethyl) ethylene phosphonate, tris(1,3-dichloropropyl) phosphate, tris(beta-chloroethyl) phosphate, tricresyl phosphate, tris(2,3-dibromopropyl)phosphate, tris(beta-chloropropyl)phosphate,tricresyl phosphate, and tris(2,3-dibromopropyl) phosphate.

In addition to the above-mentioned halogen-substituted phosphates, it is also possible to use inorganic or organic flameproofing agents, such as red phosphorus, aluminum oxide hydrate, antimony trioxide, arsenic oxide, ammonium polyphosphate (Exolit®) and calcium sulfate, expandable graphite or cyanuric acid derivatives, e.g., melamine, or mixtures of two or more flameproofing agents, e.g., ammonium polyphosphates and melamine, and, if desired, corn starch, or ammonium polyphosphate, melamine, and expandable graphite and/or, if desired, aromatic polyesters, in order to flameproof the polyisocyanate polyaddition products. In general, from 2 to 50 php, preferably from 5 to 25 php, of said flameproofing agents may be used.

Optional fillers are conventional organic and inorganic fillers and reinforcing agents. Specific examples are inorganic fillers, such as silicate minerals, for example, phyllosilicates such as antigorite, serpentine, hornblendes, amphiboles, chrysotile, and talc; metal oxides, such as kaolin, aluminum oxides, titanium oxides and iron oxides; metal salts, such as chalk, baryte and inorganic pigments, such as cadmium sulfide, zinc sulfide and glass, inter alia; kaolin (china clay), aluminum silicate and coprecipitates of barium sulfate and aluminum silicate, and natural and synthetic fibrous minerals, such as wollastonite, metal, and glass fibers of various lengths. Examples of suitable organic fillers are carbon black, melamine, colophony, cyclopentadienyl resins, cellulose fibers, polyamide fibers, polyacrylonitrile fibers, polyurethane fibers, and polyester fibers based on aromatic and/or aliphatic dicarboxylic acid esters, and in particular, carbon fibers.

The inorganic and organic fillers may be used individually or as mixtures and may be introduced into the polyol composition or isocyanate side in amounts of from 0.5 to 40 percent by weight, based on the weight of components (the polyols and the isocyanate); but the content of mats, nonwovens and wovens made from natural and synthetic fibers may reach values of up to 80 percent by weight.

There is also provided as part of the invention a polyisocyanate-based foamable composition made up of an organic isocyanate component and a polyol solution component, where the blowing agent is dispersed in the polyol solution or dispersed in both the isocyanate component and the polyol solution. In one embodiment of the invention, anywhere from 10–20 php of the $C_4$–$C_7$ hydrocarbon blowing agent is dispersed uniformly in the aromatic organic polyisocyanate; and 10–20 php of the hydrocarbon blowing agent is also dispersed uniformly in the polyol solution. The exact amount of hydrocarbon blowing agent used in the aromatic organic polyisocyanate and the polyol solution will depend upon the desired density and solubility limits of each component.

The organic polyisocyanates include all essentially known aliphatic, cycloaliphatic, araliphatic and preferably aromatic multivalent isocyanates. Specific examples include: alkylene diisocyanates with 4 to 12 carbons in the alkylene radical such as 1,12-dodecane diisocyanate, 2-ethyl-1,4-tetramethylene diisocyanate, 2-methyl-1,5-pentamethylene diisocyanate, 1,4-tetramethylene diisocyanate and preferably 1,6-hexamethylene diisocyanate; cycloaliphatic diisocyanates such as 1,3- and 1,4-cyclohexane diisocyanate as well as any mixtures of these isomers, 1-isocyanato-3,3,5-trimethyl-5-isocyanatomethylcyclohexane (isophorone diisocyanate), 2,4- and 2,6-hexahydrotoluene diisocyanate as well as the corresponding isomeric mixtures, 4,4'-2,2'-, and 2,4'-dicyclohexylmethane diisocyanate as well as the corresponding isomeric mixtures and preferably aromatic diisocyanates and polyisocyanates such as 2,4- and 2,6-toluene diisocyanate and the corresponding isomeric mixtures 4,4'-, 2,4'-, and 2,2'-diphenylmethane diisocyanate and the corresponding isomeric mixtures, mixtures of 4,4'- and 2,4'-diphenylmethane diisocyanates and polyphenylenepolymethylene polyisocyanates (polymeric MDI), as well as mixtures of polymeric MDI and toluene diisocyanates. The organic di- and polyisocyanates can be used individually or in the form of mixtures.

Frequently, so-called modified multivalent isocyanates, i.e., products obtained by the partial chemical reaction of organic diisocyanates and/or polyisocyanates are used. Examples include diisocyanates and/or polyisocyanates containing ester groups, urea groups, biuret groups, allophanate groups, carbodiimide groups, isocyanurate groups, and/or urethane groups. Specific examples include organic, preferably aromatic, polyisocyanates containing urethane groups and having an NCO content of 33.6 to 15 weight percent, preferably 31 to 21 weight percent, based on the total weight, e.g., with low molecular weight diols, triols, dialkylene glycols, trialkylene glycols, or polyoxyalkylene glycols with a molecular weight of up to 1500; modified 4,4'-diphenylmethane diisocyanate or 2,4- and 2,6-toluene diisocyanate, where examples of di- and polyoxyalkylene glycols that may be used individually or as mixtures include diethylene glycol, dipropylene glycol, polyoxyethylene glycol, polyoxypropylene glycol, polyoxyethylene glycol, polyoxypropylene glycol, and polyoxypropylene polyoxyethylene glycols or-triols. Prepolymers containing NCO groups with an NCO content of 25 to 9 weight percent, preferably 21 to 14 weight percent, based on the total weight and produced from the polyester polyols and/or preferably polyether polyols described below; 4,4'-diphenylmethane diisocyanate, mixtures of 2,4'- and 4,4'-diphenylmethane diisocyanate, 2,4,- and/or 2,6-toluene diisocyanates or polymeric MDI are also suitable. Furthermore, liquid polyisocyanates containing carbodiimide groups having an NCO content of 33.6 to 15 weight percent, preferably 31 to 21 weight percent, based on the total weight, have also proven suitable, e.g., based on 4,4'- and 2,4'- and/or 2,2'-diphenylmethane diisocyanate and/or 2,4'- and/or 2,6-toluene diisocyanate. The modified polyisocyanates may optionally be mixed together or mixed with unmodified organic polyisocyanates such as 2,4'- and 4,4'-diphenylmethane diisocyanate, polymeric MDI, 2,4'- and/or 2,6-toluene diisocyanate.

Preferably, the isocyanate used to make the closed cell rigid foams of the invention contain polymeric MDI, with the average functionality of the isocyanate component used to react with the polyol composition being 2.2 or more, more preferably 2.5 or more, most preferably 2.7 or more.

The foams of the invention are closed cell, meaning that greater than 80% of the cells are closed as measured for uncorrected porosity. Preferably, greater than 85%, more preferably 90% or more of the cells are closed as measured for uncorrected porosity. The foams of the invention are also rigid, meaning that they have a compressive strength to tensile strength ratio of at least 1.0 and an elongation at yield of less than 10%.

The foams of this invention are polyisocyanate based, meaning that the foams may be considered polyurethane, polyisocyanurate, or any mixture of the two linkages. In a method of the invention, an organic aromatic polyisocyanate having dispersed therein the $C_4$–$C_7$ hydrocarbon blowing agent, and a polyol solution having dispersed therein the same blowing agent, are fed through two separate lines to a high pressure impingement mixhead. The components are intimately mixed under high pressure for less than two (2) seconds and dispensed through the mixhead onto a substrate, such as a conveyor belt, a facer, or a mold surface. The foamable mixed composition is allowed to foam and cure. Applications for the foams made by the present invention are laminate board for building and housing insulation, refrigeration appliance cabinets, entry way door insulation, and any other application requiring rigid polyisocyanate foams using polyester-based polyols.

Polyol A is Terate 2541, a polyester polyol derived from DMT and commercially available from Cape Industries.

Polyol B is Weston PTP, a phosphite initiated polyol commercially available from General Electric Company.

Polyol C is Stepanpol 2502, a polyester polyol derived from phthalic anhydride containing a reacted compatibilizing agent based on a phenolic compound, commercially available from Stepan.

B-8462 is a silicone surfactant commercially available from Goldschmidt.

Polycat 5 is pentamethyl-diethylene triamine, a catalyst for rigid foam applications commercially available from Air Products.

Isocyanate A is a polymeric MDI having a free NCO content of 31.4, a viscosity of about 700 cps at 23° C., and having a functionality greater than 2.7, commercially available from BASF Corporation.

EXAMPLE 1

In this example, cyclopentane as a blowing agent was dispersed in both the isocyanate component and the polyol solution component in the amounts stated in Table I below. The polyol solution ingredients were mixed in a stainless steel, open top container for about thirty (30) minutes. The stainless steel container was positioned on a scale to measure the weight of the ingredients during the blending operation, and any cyclopentane gas escaping during the mixing operation was continually replenished to keep the parts by weight of the gas constant. The contents of the premix tank were transferred to the resin day tank of a high pressure impingement metering unit and continuously agitated and circulated through an in-line static mixer to prevent cyclopentane separation. When a shot of material was required, the polyol composition in the day tank was pumped to the mixhead, where it was impingement mixed with Iso A having dispersed therein cyclopentane. The calibration of the machine is stated in Table I below. The impingement mixed polyol solution and isocyanate were shot into 165 oz. cups for measurement of foam reactivity and density, into 4"×10"×10" (L×W×H) molds for free rise and 10% packed samples, and into molds measuring 48"× 12"×1.5" at the times and weights stated in Table I. The foams had suitable densities and uniform cell structures, indicating that the hydrocarbon blowing agent was uniformly dispersed into the polyol and isocyanate.

TABLE I

| Samples | 1 | 2 |
|---|---|---|
| Polyol A | 20 | 20 |
| Polyol B | 20 | 20 |
| Polyol C | 60 | 60 |
| B-8404 | 2.0 | 8.0 |
| HexChem 977 | 3.5 | 3.5 |
| Polycat 5 | 0.5 | 0.5 |
| Cyclopentane | 15 | 15 |
| Water | 0.5 | 0.5 |
| Total | 121.5 | 127.5 |
| Iso A | 202.72 | 202.72 |
| Cyclopentane | 15 | 15 |
| Index | 300 | 300 |
| #10 Lilly Cup, pcf, | 1.63 | 1.64 |
| Reactivity (seconds) | | |
| Shot Time | 2.5 | 2.5 |
| Cream | 5.2 | — |
| Gel | 20 | 20 |
| Rise | 76 | 78 |
| Tack-Free | 41 | 36 |
| Free-Rise Box | | |
| Weight | 190 | 201.3 |
| Pcf | 1.81 | 1.92 |
| Shrinkage | Yes | Yes |
| Friability | None | None |
| 10 Percent Packed Box | | |
| Weight, grams | 209.0 | 224.3 |
| Pcf | 1.99 | 2.13 |
| Door Mold | | |
| Shot | 5.56 | 5.90 |
| Weight | 435 | 468 |
| pcf free rise | 1.97 | 2.06 |
| Shot | 6.28 | 6.48 |
| Weight | 487 | 516 |
| pcf, packed | 2.15 | 2.27 |
| Calibration | | |
| Resin | 87.3 | 91.8 |
| Iso | 155.9 | 155.6 |
| RPM Resin | 586 | 618 |
| RPM Iso | 950 | 850 |
| Pressure Resin | 1900 | 2000 |
| Pressure Iso | 2000 | 2000 |

The results above indicate that polyisocyanurate foams can be made at suitable densities using a high pressure machine by dissolving cyclopentane and the isocyanate and the polyester polyol using nonyl phenol as a reacted or unreacted compatibilizing agent.

EXAMPLE 2

In this example, studies were conducted to determine the solubility limits of cyclopentane in an isocyanate and polyols. In each sample, cyclopentane was added to either the isocyanate or the polyol, mixed until uniformly dispersed, and then left standing for at least four days without agitation or movement. Subsequently, each sample was examined for phase separation between the cyclopentane and the polyol or isocyanate.

In samples 3–7, cyclopentane at the weight percentages indicated below was mixed with Isocyanate A.

| Samples | Cyclopentane | Separation |
|---|---|---|
| 3 | 5 percent | No |
| 4 | 10 percent | No |
| 5 | 15 percent | No |
| 6 | 20 percent | No |
| 7 | 25 percent | Yes |

The results above indicate that cyclopentane is miscible with Iso A at cyclopentane levels of up to about 20 percent. At 25 percent, phase separation was evident.

Cyclopentane was added to a blend of polyols comprising 80 parts by weight of Polyol A and 20 parts by weight of Polyol B.

| Samples | Cyclopentane | Separation |
|---|---|---|
| 8 | 16 percent | Yes |
| 9 | 21 percent | Yes |
| 10 | 27 percent | Yes |

The results of Samples 8–10 indicate that cyclopentane phase separated within four days without the use of a reacted or unreacted compatibilizing agent.

In samples 11–14 described below, cyclopentane was maintained at constant levels in different polyol blends. A description of each polyol blend and the level of cyclopentane loadings is listed below along with the results on phase separation. All numbers indicated below are in parts by weight. The polyol blend employed was a mixture of Polyol A, Polyol B, and Polyol C, with different amounts reported below corresponding to each polyol respectively. Polyol C is a polyol that contains nonyl phenol as a reacted or unreacted compatibilizing agent.

TABLE II

| SAMPLES | BLEND PROPORTIONS | CYCLO-PENTANE | SEPARATION |
|---|---|---|---|
| 11 | 80/20/0 | 15 pbw | Yes |
| 12 | 60/20/20 | 15 pbw | Yes |
| 13 | 40/20/40 | 15 pbw | Yes |
| 14 | 20/20/60 | 15 pbw | No |

The results of these experiments indicate that the nonyl phenol reacted or unreacted compatibilizing agent in Polyol C was at a high enough level in Sample 14 to effectively solubilize cyclopentane in the polyester polyols. Without the presence of the reacted or unreacted compatibilizing agent nonyl phenol, as in Sample 11, cyclopentane would not form a solution with the polyester polyols.

What we claim is:

1. A polyol solution comprising:

a) a polyol having polyester linkages;

b) a blowing agent comprising an aliphatic or cycloaliphatic $C_4$–$C_7$ hydrocarbon;

c) a reacted or unreacted compatibilizer represented by the following formula:

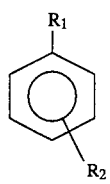

wherein $R^1$ is OH, $NH_2$, COOH, or oxyalkylated addition products thereof; and $R^2$ is a $C_6$–$C_{24}$ aliphatic, branched or unbranched, hydrocarbon group.

2. The polyol solution of claim 1, wherein $R^1$ comprises OH or oxyalkylated addition products thereof, and $R^2$ is a saturated, unbranched, hydrocarbon group.

3. The polyol solution of claim 2, wherein the reacted or unreacted compatibilizer comprises nonyl phenol or the oxyalkylated addition products thereof.

4. The polyol solution of claim 2, wherein the blowing agent comprises n-pentane, isopentane, cyclopentane, or mixtures thereof.

5. The polyol solution of claim 4, wherein the blowing agent further comprises water.

6. The polyol solution of claim 4, wherein the polyol comprises an aromatic polyester polyol.

7. The polyol solution of claim 1, comprising 10–20 php of the hydrocarbon blowing agent.

8. The polyol solution of claim 1, wherein $R^1$ is OH or oxyalkylated addition products thereof; the polyol comprises an aromatic polyester polyol; and the blowing agent comprises n-pentane, isopentane, cyclopentane, or mixtures thereof.

9. The polyol solution of claim 8, comprising a polyol derived from dimethyl terephthalate, phthalic acid, terephthalic acid, polyethylene terephthalate, the anhydrides thereof, or mixtures thereof, and the compatibilizer is reacted.

10. The polyol solution of claim 1, comprising a polyol derived from dimethyl terephthalate or phthalic anhydride; a blowing agent comprising n-pentane, isopentane, cyclopentane, or mixtures thereof; and a reacted compatibilizer comprising nonyl phenol or oxyalkylated addition products thereof.

11. The polyol solution of claim 10, wherein the blowing agent comprises cyclopentane.

12. The polyol solution of claim 11, wherein the blowing agent comprises cyclopentane in an amount of 10–20 php, and water.

* * * * *